May 11, 1965 M. M. ROUZIER 3,183,308

CONTROL DEVICE FOR ELECTRONIC TELEPHONIC SWITCHING NETWORKS OF LARGE CAPACITY

Filed Nov. 13, 1961 5 Sheets-Sheet 1

INVENTOR
MICHEL M. ROUZIER
BY
Abraham A. Saffitz
ATTORNEY

May 11, 1965 M. M. ROUZIER 3,183,308

CONTROL DEVICE FOR ELECTRONIC TELEPHONIC SWITCHING NETWORKS OF LARGE CAPACITY

Filed Nov. 13, 1961 5 Sheets-Sheet 2

INVENTOR
MICHEL M. ROUZIER
BY
Abraham A. Saffitz
ATTORNEY

May 11, 1965 M. M. ROUZIER 3,183,308

CONTROL DEVICE FOR ELECTRONIC TELEPHONIC SWITCHING NETWORKS OF LARGE CAPACITY

Filed Nov. 13, 1961 5 Sheets-Sheet 3

INVENTOR
MICHEL M. ROUZIER
BY
Abraham A. Saffitz
ATTORNEY

INVENTOR
MICHEL M. ROUZIER
BY
Abraham A. Saffitz
ATTORNEY

May 11, 1965 M. M. ROUZIER 3,183,308

CONTROL DEVICE FOR ELECTRONIC TELEPHONIC SWITCHING NETWORKS OF LARGE CAPACITY

Filed Nov. 13, 1961 5 Sheets-Sheet 5

INVENTOR
MICHEL M. ROUZIER
BY
Abraham A. Saffitz
ATTORNEY

United States Patent Office 3,183,308
Patented May 11, 1965

3,183,308

CONTROL DEVICE FOR ELECTRONIC TELEPHONIC SWITCHING NETWORKS OF LARGE CAPACITY

Michel M. Rouzier, 22 Chemin des Postes, Clichy-sous-Bois, France

Filed Nov. 13, 1961, Ser. No. 151,981
Claims priority, application France, Dec. 30, 1960, 848,404/60
3 Claims. (Cl. 179—18)

The present invention relates to control devices for electronic telephonic switching networks of large capacity and particularly to devices for controlling switching networks constituted by electronic matrices in which the crosspoints are P-N-P-N diodes.

In the present specification the expression "switching networks of large capacity" is intended to mean a plurality of cascade-connected switching network stages, each comprising a number of switching matrices. The path established through the network after the operation of the crosspoints between an incoming telephonic line and an outgoing telephonic line will be called a junction.

It is known to effect the operation of a crosspoint formed by a P-N-P-N diode by applying two electrical pulses respectively to the input and the output of the matrix corresponding to the crosspoint.

It is also known that in certain prior devices for controlling switching networks, one of the above-mentioned two control pulses can be applied simultaneously to a part or to the whole of the matrices of a switching stage instead of being applied only to the matrix which contains the crosspoint in question. The disadvantage of this process is that the total electrical power provided by the control pulse must be proportional to the number of matrices which are energized simultaneously.

Another disadvantage of this method of control is that it may give rise to switching noise of an appreciable amplitude, owing to the fact that the control pulses are applied not only to the junction corresponding to the crosspoint to be controlled, but also to all the free or busy junctions of which the locations, in the matrices of the same stage, are analogous to that which is occupied by the junction in question in its own matrix. In fact a pulse applied to an engaged junction gives rise to a variation in the current passing through the chain of connections which has been established and consequently causes a switching noise capable of disturbing the telephonic conversation which is taking place through this junction.

In spite of these disadvantages this method of controlling the crosspoints of matrices of a given switching stage is of interest since the junction to be controlled can be selected from among the junctions of a single matrix and not from among the whole of the junctions of all the matrices of the switching stage.

The object of the invention is to provide a device for controlling a multi-stage switching network of which each stage comprises a number of matrices, in which the connection control pulses are applied on the one hand to the individual inputs of the matrices of the first stage and on the other hand to input groups and output groups of the matrices of the intermediate and final stages, and in which the noise generated by the connection control pulses in the conversations which are taking place through the switching network is much smaller than in the electronic switching systems of the same type in the prior art.

It is known that the spreading of the dynamic break-over voltage of P-N-P-N diodes, due to the shape of the wavefront of the connection control pulses, can be reduced to an appreciable extent by the use of means permitting two pulses, of which the wavefronts are slightly displaced in time, to be applied respectively to the two terminals of a P-N-P-N diode, the first pulse serving to bring the voltage at the terminals of the P-N-P-N diodes close to the break-over voltage and the second pulse, the waveform of which has a wavefront of progressive and non-abrupt shape, switching the diode to its conductive state, the diode being thus provided with initial conditions such that the break-over voltage is more closely defined. In the application of this principle to the case in which a number of P-N-P-N diodes belonging to switching matrices connected in cascade are to be simultaneously connected, a first connection control pulse is applied to one of the terminals of the first diode and pulses are applied to the common terminals of the cascade-connected diodes and to the external terminal of the last diode, these pulses having wavefronts which are displaced in time and having of course a common portion and, with the exception of the first, a wavefront slope which is relatively small owing to the use of integrating circuits.

As a consequence, when it is stated in the following that the connection control pulses are applied simultaneously to different diodes in cascade in a path to be switched, it must be borne in mind that in spite of the use of the word simultaneously, the wavefronts of these pulses may be displaced in time by a few microseconds.

The device according to the invention comprises a number of switching stages each of which is constituted by a certain number of matrices of crosspoints, connection control devices for the individual inputs of the matrices of the first stage permitting the application of connection pulses to each of these individual inputs, connection control devices for groups of outputs of the matrices of the first stage and groups of outputs of the matrices of the intermediate stages and the final stage permitting the application of connection pulses in parallel to all the outputs constituting the said groups, these groups being formed by the outputs having the same order in the different matrices of the stage in question and means for cancelling, in the connection control devices for the output groups, the action of a connection control pulse on those of the outputs of the group which correspond to cross-points which are already engaged.

In greater detail, the connection control devices for the groups of outputs of the matrices of the first, intermediate and final stages comprise a connection control amplifier to the input terminal of which is applied a connection control pulse and a compensating amplifier to the input terminal of which is applied a compensating pulse, simultaneously with the connection control pulse, and the outputs of the connection control amplifier and the compensating amplifier are connected in parallel to the groups of outputs of the matrices of the first, intermediate and final switching stages respectively by way of a first path comprising a resistance and a second path comprising a resistance and a diode in series, and the amplitudes of the connection control pulses and compensating pulses are suitably determined so that the sum of the current flows passing through the two above-mentioned paths when the connection control and compensating amplifiers are blocked shall be equal to the current flow passing through the first path when the said amplifiers are conductive and produce respectively the connection control and compensating pulses, the compensating pulse then blocking the diode of the said second path.

The invention will now be described in detail with reference to the accompanying drawings, in which.

Figure 1:
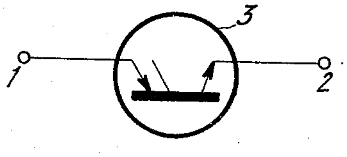
FIG. 1 shows the symbol used to represent P-N-P-N diodes.

FIG. 1 shows at 3 a P-N-P-N diode the two terminals of which are indicated by 1 and 2. The symbol used is that shown in the article by T. P. Sylvan entitled "Two-Terminal Solid-Stage Switches," "Electronics," February 27, 1959, volume 32, No. 9, pages 62 and 63. It is the symbol proposed by the Institute of Radio Engineers. When the diode 3 is in the conductive state continuous current flows from terminal 1 to terminal 2.

Figure 2:
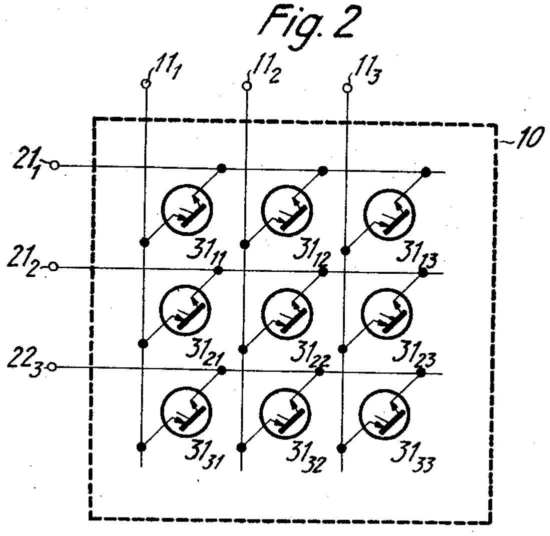
FIG. 2 shows the structure of a matrix of crosspoints constituted by P-N-P-N diodes, the matrix having three rows and three columns.

FIG. 2 shows a switching matrix 10 comprising nine crosspoints $31_{11}$ to $31_{33}$ constituted by P-N-P-N diodes. The diode $31_{21}$, for example, is rendered conductive by the application of a first connection control pulse of negative polarity and of twenty microseconds duration, for example, to the terminal of the row $21_2$ and by the application, after a given time, of a second connection control pulse of positive polarity and of fifteen microseconds duration, for example, to the terminal of the column $11_1$. The two connection control pulses have wavefronts which are spaced apart in time by five microseconds and coinciding trailing edges. The same diode $31_{21}$ is switched off by the application of a disconnecting pulse of negative polarity and of twenty microseconds duration to the terminal of column $11_1$.

Figure 3:
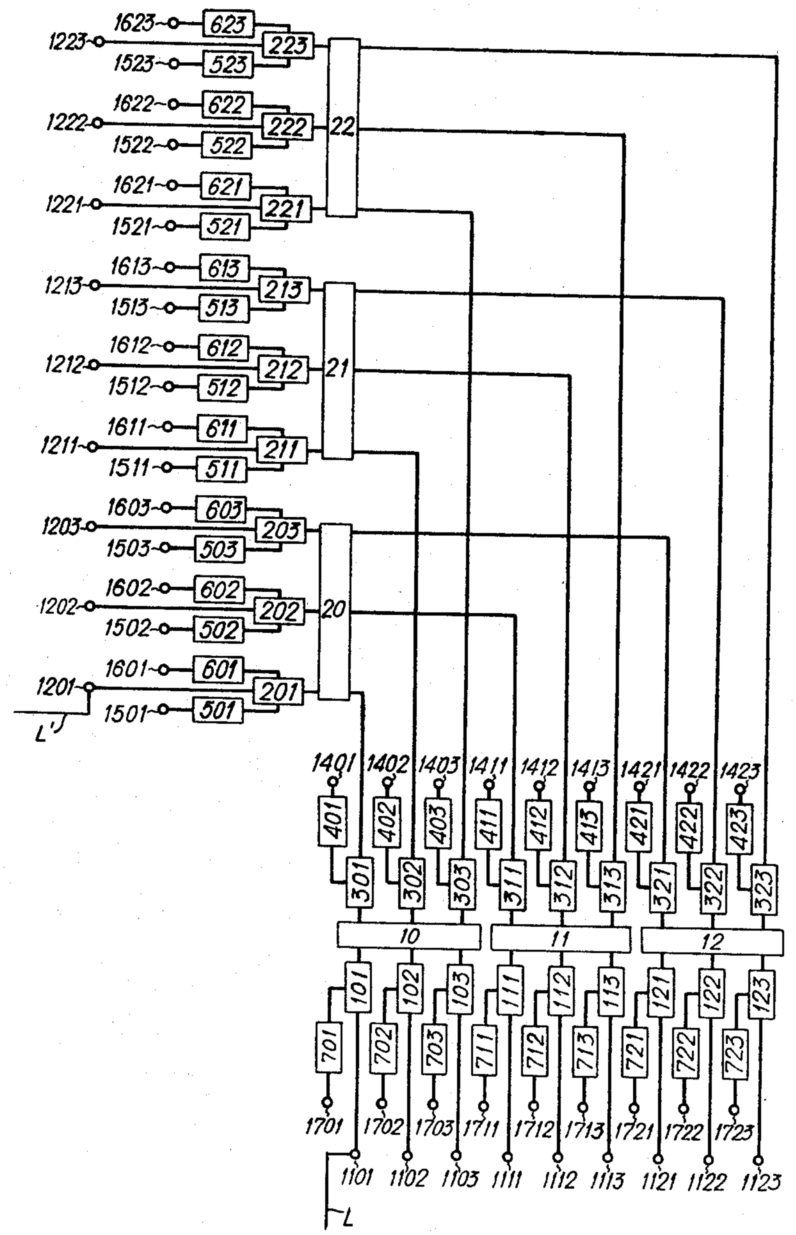
FIG. 3 is a block diagram representing a two-stage switching network controlled by connection control devices of known kind each operating on an individual input or output of the matrices of a switching stage.

FIG. 3 is a block diagram representing a device for controlling a two-stage switching network of a type which is known from the prior art.

In FIG. 3 there will be considered, by way of example, the interconnection of six matrices 10, 11, 12, 20, 21 and 22, each having three rows and three columns, forming a two-stage switching network, the first stage including matrices 10, 11, 12 and the second stage matrices 20, 21, 22. The two stage network shown in FIG. 3 connects nine inputs 1101, 1102, 1103, 1111, 1112, 1113, 1121, 1122, 1123 to nine outputs 1201, 1202, 1203, 1211, 1212, 1213, 1221, 1222, 1223, by way of fifty-four crosspoints, while a matrix of nine rows and nine columns would necessitate eighty-one crosspoints.

Between each incoming line L and the first stage of matrices to which it is connected in the form shown in FIG. 3, there is inserted a connection control circuit or AND gate 101 having two inputs, one designated by 1101 to which the incoming line is connected and the other controlled by a connection control amplifier 701. Similar assemblies, each including a connection control circuit and a connection control amplifier, are provided at the outputs of the matrices of the first stage (for example 301 and 401 respectively), at the outputs of the matrices of each intermediate stage if any and at the outputs of the matrices of the final stage (for example 201 and 501 respectively). Moreover, the connection control circuits of the final stage have three inputs, a disconnection control amplifier being connected to the third input (601 for example).

In order to establish a transmission path between an incoming line L connected to the input 1101 and an outgoing line L′ connected to the output 1201, after having checked by means outside the scope of the present invention that this route is not engaged, there will be applied:

To the terminal 1701 of the amplifier 701 individually associated with the connection control circuit 101, at the time $t_0$, a negative pulse of twenty-five microseconds duration;

To the terminal 1401 of the amplifier 401 individually associated with the connection control circuit 301, at time $(t_0+5)$ microseconds, a positive pulse of twenty microseconds duration;

To the terminal 1501 of the amplifier 501 individually associated with the connection control circuit 201, at time $(t_0+10)$ microseconds, a positive pulse of fifteen microseconds duration.

In order to effect the disconnection between the input 1101 and the output 1201, it suffices to apply a negative pulse to the terminal 1601 of the disconnection amplifier 601 individually associated with the connection control circuit 201.

Figure 4:
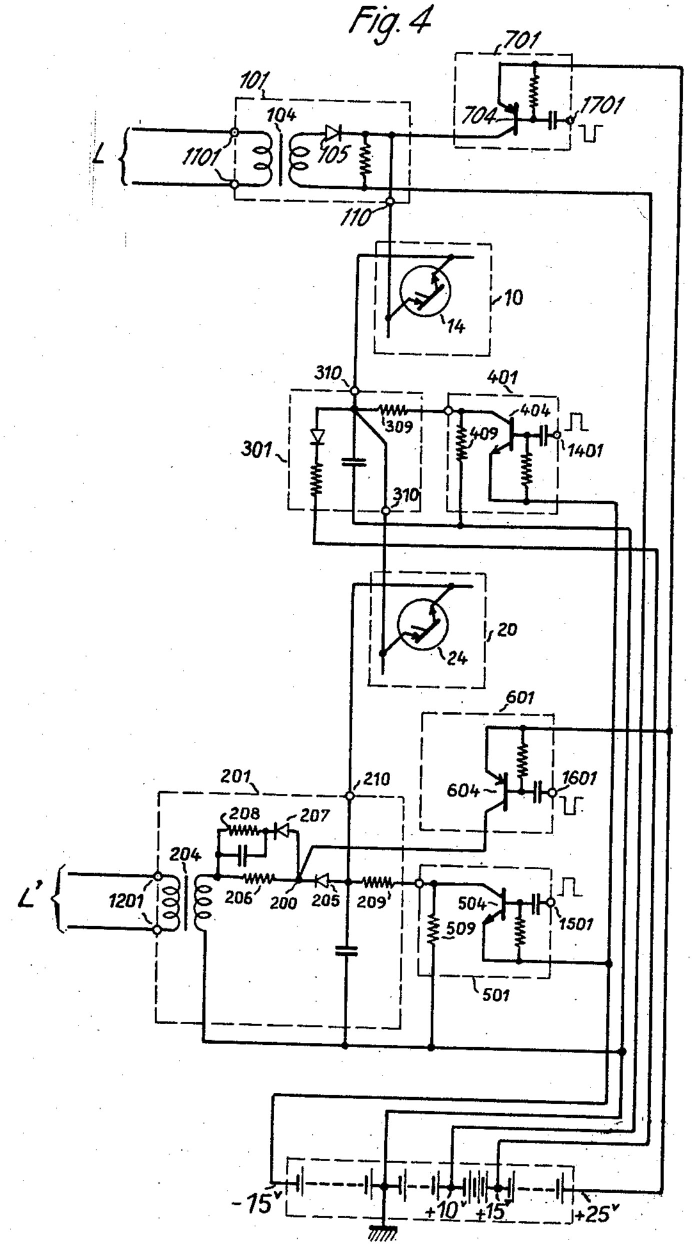
FIG. 4 shows in detail the two-stage switching network of FIG. 3 and its connection control devices.

FIG. 4 shows details of the different circuits 101, 701, 301, 401, 201, 501, 601, represented in FIG. 3.

The amplifier 701 is constituted by a P-N-P transistor 704 the emitter of which is connected to a source of positive potential of twenty-five volts, and the base is connected through a capacitor to the terminal 1701. The control circuit 101 comprises a transformer 104 of which the primary winding is connected through the terminals 1101 to the incoming telephonic line L and of which the secondary winding, which is shunted by the load resistance of the transistor 704, is connected on one side to a source of positive potential of ten volts and on the other side, by way of a diode 105, to the collector of the transistor 704, and through a terminal 110 to a column of the first stage matrix 10 of which only one crosspoint, the P-N-P-N diode 14, has been shown. The diode 105 prevents the control pulse applied to the point 1701 and amplified by the transistor 704 from being transmitted to the transformer 104, and thus to the line L.

The amplifier 401 is constituted by an N-P-N transistor 404 the emitter of which is connected to a source of negative potential of 15 volts and the base of which is connected through a capacitor to the terminal 1401. The collector of the transistor 404 is connected to earth through a load resistor 409 and through a resistor 309 to a point 310 of the intermediate control circuit 301 which is directly connected to a row of the first stage matrix 10 and to a column of the second and final stage matrix 20, of which only one crosspoint, the P-N-P-N diode 24, has been shown. The point 310 is in addition connected through a capacitor to earth and through a diode in series with a resistor to a positive potential of 15 volts. The amplifier 501 is, like the amplifier 401, an N-P-N transistor 504 having an emitter voltage of −15 volts and a load resistor 509 which is connected to earth. The transistor 504 is controlled by positive pulses applied to its base through the point 1501 and a capacitor. The disconnection amplifier 601 is a P-N-P transistor 604 controlled by negative pulses applied to the point 1601. The control circuit 201 comprises a transformer 204 of which the secondary winding is connected through the terminals 1201 to the telephonic line L′ and of which the primary winding is connected, on one side to earth and on the other side through a resistor 206 and a diode 205 in series to an output terminal 210 which is connected to a row of the matrix 20 and, through a capacitor, to earth. The point 200 at the junction of the resistor 206 and the diode 205 is connected to the collector of the transistor 604. The terminal 210 is additionally connected through a resistor 209 to the collector of the transistor 504. The diode 205 prevents the negative pulse which results at the collector of the transistor 504 from the control pulse applied to the point 1501, from being transmitted to the transformer 204 and as a consequence to the line L′. The resistor 206 is the impedance intended to limit the direct current in the low impedance junction established between the positive potential of 10 volts and earth when the lines L and L′ are connected, as will be seen below. To prevent the resistor 206 from creating an excessive attenuation of the telephonic currents, this resistor is shunted by a capacitor in parallel with a resistor 208 and in series with a diode 207. The diode 207 has for its object to prevent the discharge of the capacitor which is in parallel with the resistor 208 from blocking the diode 205 and thus causing the blocking of the P-N-P-N diodes 24 and 14 at the end of the connection control pulse applied to the point 1501.

With regard to the operation of connecting up the junction L–L′, the negative pulse applied to the terminal 1701 of the amplifier 701 saturates the transistor 704. The potential of the point 110 changes from +10 volts to +25 volts. Simultaneously, the positive pulse applied to the input terminal 1401 of the amplifier 401 saturates the transistor 404. The potential of the point 310 changes from zero volts to −15 volts. The P-N-P-N diode 14 of the matrix 10 then changes over to its conductive state and the potential of the point 310 changes to +25 volts.

The positive pulse applied simultaneously to the input terminal 1501 of the amplifier 501 saturates the transistor 504. The potential of the point 210 changes from zero volts to 15 volts negative. The P-N-P-N diode 24 of the matrix 20 then changes to its conductive state and the potential of point 210 changes to 25 volts positive.

At the end of the above-mentioned pulses, and during the course of the telephonic conversation established through the crosspoints 14 and 24, points 110, 210 and 310 are at a potential of 10 volts positive.

The transformer 104, which is associated with the incoming telephonic line L, is the seat of three currents, namely:

(1) The normal principal current which passes in succession through the diode 105, the P-N-P-N diodes 14 and 24, the diode resistance assemblies 205–206 and 207–208 and the transformer 204 associated with the outgoing telephonic line L′. The principal current is modulated by audiofrequency telephonic.

(2) A first auxiliary current which starts at the 10 volt positive terminal of the supply source, passes through the diode 105, the P-N-P-N diode 14 and the resistors 309 and 409 and terminates at the zero volt terminal.

(3) A second auxiliary current which starts at the 10 volt positive terminal of the supply source, passes through the diode 105, the P-N-P-N diodes 14 and 24, the resistors 209 and 509 and terminates at the zero volt terminal.

With regard to the disconnecting operation the negative pulse applied to the terminal 1601 of amplifier 601 saturates the transformer 604. The potential of point 200 then changes from +10 volts to +25 volts. The diode 205 connecting the points 200 and 210 blocks, causing the principal current to be cut off. The P-N-P-N diodes 14 and 24, being unable to remain conductive by reason of the auxiliary currents, also block.

Figure 5:
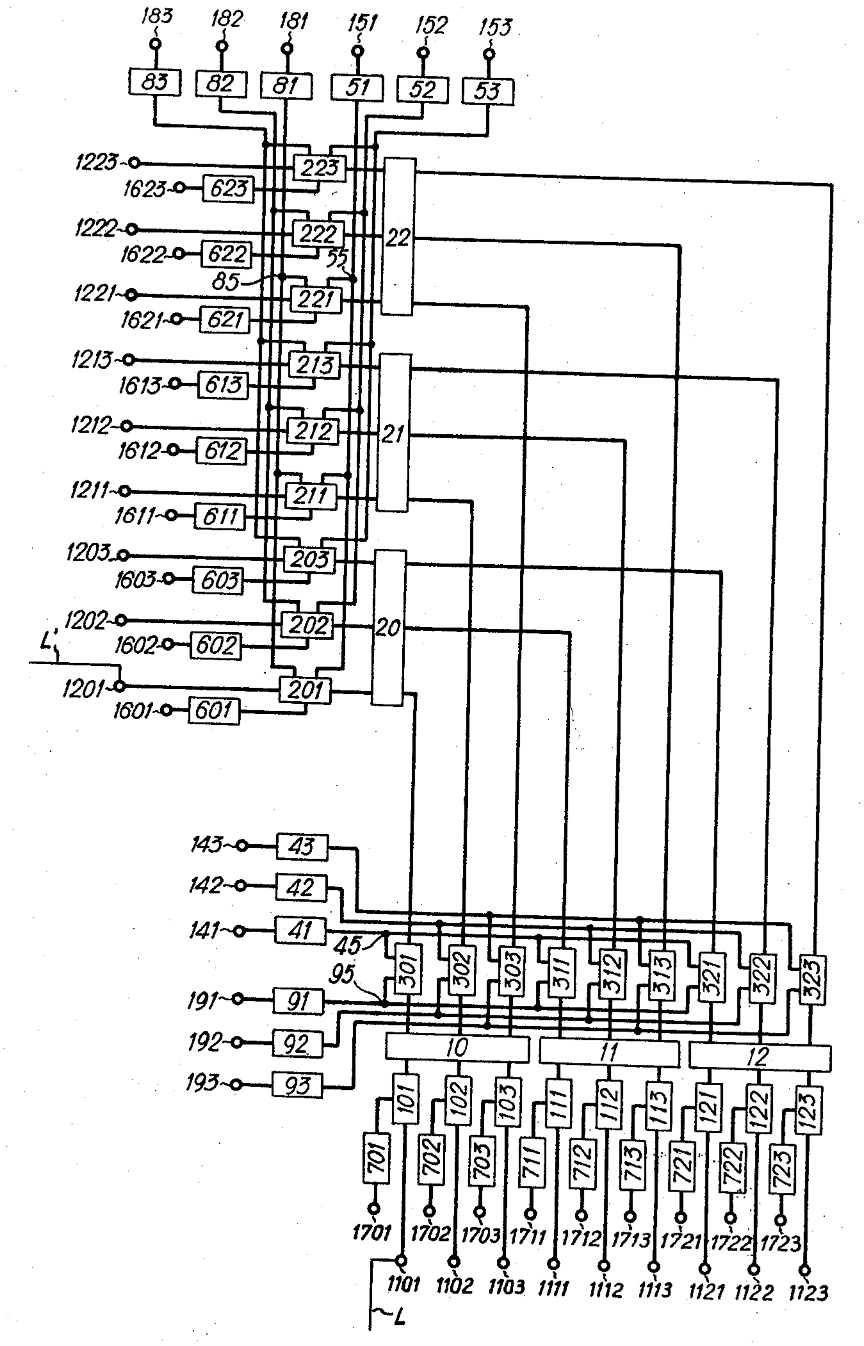
FIG. 5 is a block diagram representing a two-stage switching network controlled by connection control devices according to the invention.

FIG. 5 is a block diagram representing the two-stage switching network together with the connection control devices according to the invention. The reference numerals of circuits which are identical to those of FIG. 3 are the same as in this latter figure. An examination of FIG. 5 shows the changes which have been introduced into the switching network of FIG. 3. These changes are as follows:

(*a*) The connection control circuits 201 to 203, 211 to 213, and 221 to 223, which received respectively the connection control pulses from amplifiers 501 to 503, 511 to 513, and 521 to 523 (FIG. 3), are controlled by amplifiers common to groups of three control circuits. The circuits of order 1 of each switching matrix of the second stage 20 to 22, that is to say circuits 201, 211 and 221, receive connection control pulses by way of the amplifier 51. In the same way, the circuits of order 2 of each switching matrix of the second stage 20 to 22, are connected to the connection control amplifier 52, and the circuits of order 3 to the connection control amplifier 53.

(*b*) The connection control circuits 301 to 303, 311 to 313, and 321 to 323, which received respectively connection control pulses from the amplifiers 401 to 403, 411 to 413, and 421 to 423 (FIG. 3), are controlled by amplifiers common to groups of three control circuits. The circuits of order 1 of each switching matrix of the first stage 10 to 12, that is to say circuits 301, 311 and 321, receive connection control pulses by way of amplifier 41. In the same way, circuits of order 2 of each switching matrix of the first stage 10 to 12 are connected to the connection control amplifier 42, and the circuits of order 3 to the connection control amplifier 43.

(*c*) A compensating amplifier 81 is associated with control circuits 201, 211 and 221, a compensating amplifier 82 with control circuits 202, 212 and 222, and a compensating amplifier 83 with control circuits 203, 213 and 223.

(*d*) A compensating amplifier 91 is associated with control circuits 301, 311 and 321, a compensating amplifier 92 with control circuits 302, 312 and 322, and a compensating amplifier 93 with control circuits 303, 313 and 323.

Figure 6:
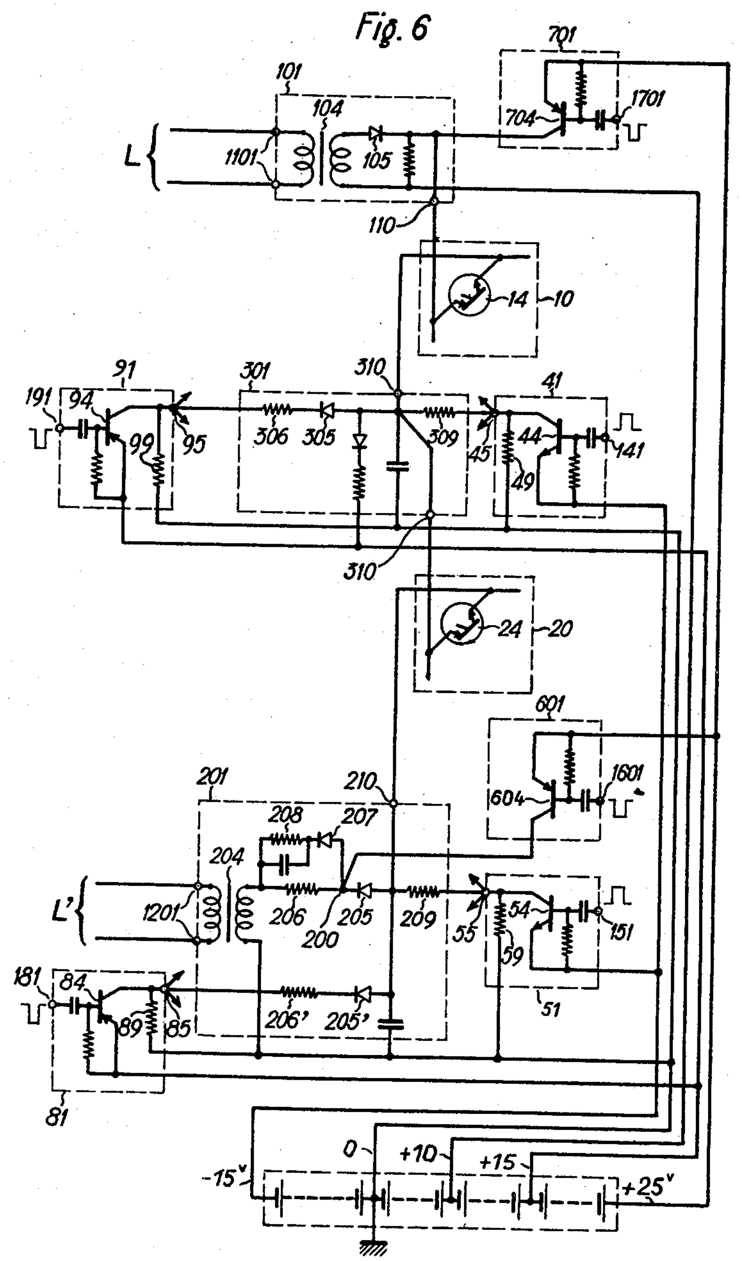
FIG. 6 shows in detail the two-stage switching network of FIG. 5 and its connection control devices, incorporating a connection control amplifier and compensating amplifier, according to the invention.

Referring now, in anticipation, to FIG. 6, the connection control amplifier 41 is connected to the output 310 of the P-N-P-N diode 14 of matrix 1 of the first stage and to the input 310 of P-N-P-N diode 24 of the matrix 20 of the second stage through a resistance 309 constituting the first path mentioned in the introduction to the present specification. The compensating amplifier 91 is connected to the output 310 of P-N-P-N diode 14 of matrix 10 of the first stage and to the input 310 of P-N-P-N diode 24 of matrix 20 of the second stage through a diode 305 and a resistor 306 in series, constituting the second path, also mentioned in the introduction. In the same way, the connection control amplifier 51 is connected to the output 210 of P-N-P-N diode 24 of matrix 20 of the second stage through a resistor 209 constituting the first path and the compensating amplifier 81 is connected to this same output 210 through a diode 205′ and a resistor 206′ in series, constituting the second path.

To establish a connection between an incoming line L connected to the input 1101 and an outgoing line L′ connected to the output 1201 for example, after having checked by means outside the scope of the present invention that this route is not engaged, there are applied:

To terminal 1701 of amplifier 701 individually associated with the connection control circuit 101 a negative pulse of twenty-five microseconds duration, at time $t_0$;

To terminals 141 and 191 of amplifiers 41 and 91 associated with control circuits 301, 311 and 321, at time $(t_0+5)$ microseconds, a pair of pulses, that applied to amplifier 41 being of positive polarity and that applied to amplifier 91 being of negative polarity, and both having a duration of twenty microseconds;

To terminals 151 and 181 of amplifiers 51 and 81 associated with control circuits 201, 211 and 221, at time $(t_0+10)$ microseconds, a pair of pulses, that applied to amplifier 51 being of positive polarity and that applied to amplifier 81 being of negative polarity, both having a duration of fifteen microseconds.

To effect the disconnection of the input 1101 and the output 1201 it suffices to apply a negative pulse to terminal 1601 of the disconnection amplifier 601 individually associated with the connection control circuit 201.

FIG. 6 shows the details of the two-stage switching network according to the invention.

The negative pulse applied to terminal 1701 of amplifier 701 individually associated with control circuit 101 saturates transistor 704. The potential of point 110 changes from +10 volts to +25 volts. Simultaneously, the positive pulse applied to the input terminal 141 of amplifier 41, common to the control circuits 301, 311 and 321, saturates transistor 44. The potential of point 45 changes from zero volts to −15 volts. The negative pulse applied simultaneously to the input terminal 191 of amplifier 91, common to the control circuits 301, 311 and 321, saturates transistor 94. The potential of point 95 changes from zero volts to +15 volts. Consequently, for the three circuits 301, 311 and 321, their common point 45 changes from zero volts to −15 volts, and their common point 95 changes from zero volts to +15 volts.

Diode 305, a new element added in the circuit 301, is blocked; the potential of point 310 is −15 volts. The P-N-P-N diode 14 of matrix 10 switches on and the potential of point 310 changes to +25 volts.

For the control circuits 311 and 321, two cases are to be distinguished:

(*a*) If the points corresponding to point 310 are free (potential of zero volts), the potential of these points changes to −15 volts, but the P-N-P-N diodes of the corresponding matrices 11 and 12 do not switch on owing to the fact that they are not marked on their terminals corresponding to terminal 110.

(*b*) If the points corresponding to point 310 are engaged (potential of +10 volts), the operation becomes more complicated and will be explained in detail hereafter.

The positive pulse applied to the input terminal 151 of amplifier 51, common to the control circuits 201, 211 and 221, saturates transistor 54. The potential of point 55 changes from zero volts to −15 volts. The negative pulse applied simultaneously to the input terminal 181 of amplifier 81, common to the control circuits 201, 211 and 221, saturates transistor 84. The potential of point 85 changes from zero volts to +15 volts. Consequently, for the three circuits 201, 211 and 221, their common point 55 changes from zero volts to −15 volts, and their common point 85 changes from zero volts to +15 volts.

Diode 205′, a new element added in the circuit 201, is blocked; the potential of point 210 is −15 volts. P-N-P-N diode 24 of matrix 20 switches on and the potential of point 210 changes to +25 volts.

For the control circuits 211 and 221, two cases are to be distinguished:

(*a*) If the points corresponding to point 210 are free (potential of zero volts) the potential of these points changes to −15 volts, but the P-N-P-N diodes of the corresponding matrices 21 and 22 do not switch on owing to the fact that they are not marked at their terminals corresponding to terminal 310 (directly connected to terminal 110 when crosspoint 14 has fired).

(*b*) If the points corresponding to point 210 are engaged (potential of +10 volts) the operation becomes more complicated and will be explained in detail hereafter.

At the end of the connection control pulses and compensating pulses, during the telephonic conversation which has been established, points 110, 310 and 210 are at a potential of +10 volts.

Five currents then pass through the telephonic transformer 104:

(1 to 3) The three currents already mentioned in connection with the operation of the apparatus shown in FIGS. 3 and 4.

(4) A third auxiliary current which starts at the +10 volt terminal of the supply source passes through diode 105, P-N-P-N diode 14, diode 305 and resistors 306 and 99, and terminates at the zero-volt terminal.

(5) A fourth auxiliary current which starts at the +10 volt terminal of the supply source, passes through the diode 105, P-N-P-N diode 14, P-N-P-N diode 24, diode 205′ and resistors 206′ and 89, and terminates at the zero-volt terminal.

It will now be shown that, if during a telephonic conversation connection control pulses are applied to circuits 301 and 201, the switching noises which they create are greatly attenuated. In greater detail, an explanation will be given of the behaviour of the control circuit 301 when the junction 1101–1201 is engaged and connection control and compensating pulses are applied to points 45 and 95 for the control of one of the circuits 311 or 321.

During the telephonic conversion, the potential of point 310 is +10 volts. The first auxiliary current previously mentioned passes through resistors 309 and 49 and the third current passes through diode 305 and resistors 306 and 99. The value of these currents is mainly determined by the values of resistors 306 and 309 which are much greater than resistors 49 and 99.

When connection control and compensation pulses are applied simultaneously to terminals 141 and 191 (amplifier 41) includes a P-N-P transistor 44 and amplifier 91 includes an N-P-N transistor 94, and the connection control and compensating pulses are of opposite polarities, which enables a reduction of the noise due to the capacitive coupling between the control circuits and the conversation circuits), the potential of point 45 changes from zero to −15 volts, and the potential of point 95 changes from zero to +15 volts. As a result, there is an increase of the first auxiliary current passing through the resistor 309 and the third auxiliary current passing through the resistor 306 is cut off since diode 305 is blocked. It will thus be seen that by a suitable choice of the values of resistors 306 and 309, the resulting variation of the sum of the first and third auxiliary currents can be rendered almost nil.

By way of example, if resistors 309, 49, 306 and 99 have the following values:

$$R_{309}=56{,}000 \text{ ohms}, R_{49}=1{,}000 \text{ ohms}$$

$$R_{306}=37{,}000 \text{ ohms}, R_{99}=1{,}000 \text{ ohms}$$

the sum of the first auxiliary current passing through resistors 309 and 49, and the third auxiliary current passing through resistors 306 and 99 is:

$$i=10\frac{(56{,}000+1{,}000+37{,}000+1{,}000)}{(56{,}000+1{,}000)\,(37{,}000+1{,}000)}=0.44 \text{ ma.}$$

During a pulse, the first auxiliary current passing through resistor 309 and transistor 44 in its conductive state is:

$$i'=\frac{25}{56{,}000}=0.44 \text{ ma.}$$

the third current being then zero; the sum of the two currents is thus 0.44 ma. It will thus be seen that the sum of the two auxiliary currents has not changed. The condition to be fulfilled is as follows: If $V_{310}$ is the potential of point 310 during the telephonic conversation and $V_{45}$ the potential of point 45 when transistor 44 is conductive:

$$V_{310}\frac{(R_{309}+R_{49}+R_{306}+R_{99})}{(R_{309}+R_{49})\,(R_{306}+R_{99})}=\frac{V_{310}-V_{45}}{R_{309}}$$

The explanation of the operation of the control circuit 201 is the same as that of control circuit 301. It is only necessary to replace respectively the resistors 306, 99, 309 and 49 by resistors 206′, 89, 209 and 59, and the diode 305 by the diode 205′.

Although the invention has been described for the case in which the crosspoints are matrices of P-N-P-N diodes, it is equally applicable to other types of crosspoints, and particularly with all crosspoints having a negative impedance characteristic between two of their terminals (gaseous diodes, double-base diodes, etc.).

What I claim is:

1. In a multi-stage switching network comprising a first switching stage and at least one other switching stage connected in cascade therebetween, each of said switching stages being constituted by a plurality of identical matrices of crosspoints having the same number of outputs numbered in a given number sequence, a control device for establishing transmission paths through said cascade-connected stages comprising means for applying connection control pulses selectively to each input of said matrices of said first stage, means for applying connection control pulses in parallel to groups of outputs of the matrices of each stage, each of said groups including an output per matrix of said stage and said outputs having the same number in the matrices of the stage, means for applying connection noise suppression pulses simultaneously with said connection control pulses to said output groups, means for subtracting said connection noise suppression pulses from said connection control pulses at the outputs of switched-on crosspoints and means for inhibiting said connection noise suppression pulses at the outputs of switched-off crosspoints.

2. A control device for establishing transmission paths through a multi-stage switching network comprising a plurality of switching stages connected in cascade therebetween each of said switching stages being constituted by a plurality of identical matrices of crosspoints having the same number of outputs numbered in a given number sequence, a connection control pulse source, first connection control devices for the individual inputs of the matrices of the first stage, means for selectively applying said connection control pulses to each of these first connection control devices, second connection control devices for groups of outputs of the matrices of each stage, means for selectively applying said connection control pulses in parallel to all the outputs constituting the said groups, these groups being formed by the outputs having the same number in the different matrices of the stage, a connection noise suppression pulse source, means for applying said connection noise suppression pulses simultaneously with said connection control pulses to said output groups, means for subtracting said connection noise suppression pulses from said connection control pulses at the outputs of switched-on crosspoints and means for inhibiting said connection noise suppression pulses at the outputs of switched-off crosspoints.

3. A control device for establishing transmission paths through a multi-stage switching network comprising a plurality of switching stages connected in cascade therebetween, each constituted by a plurality of identical matrices of crosspoints having the same number of outputs numbered in a given number sequence, a source of connection control pulses, first connection control devices for the individual inputs of the matrices of the first stage, means for selectively applying said connection control pulses to each of these first connection control devices, a connection noise suppression pulse source, second connection control devices for groups of outputs of the matrices of each, these groups being formed by the outputs having the same number in the different matrices of the stage, a connection noise suppression pulse source, connection control amplifiers, means for applying to the inputs of said connection control amplifiers said connection control pulses, connection noise suppression amplifiers respectively associated with said connection control amplifiers, means for applying to the inputs of said connection noise suppression amplifiers said connection noise suppression pulses simultaneously with the application of connection control pulses to said control control amplifiers, a first path connecting the output of each of said connection control amplifiers to said matrix output groups including a resistor, a second path connecting the output of each of said connection noise suppression amplifiers to said matrix output groups including a resistor and a diode in series, said first and second paths being traversed by first and second portions of the total direct current flowing through a crosspoint is switched-on, whereby upon the simultaneous application of a connection control pulse to a connection control amplifier and of a connection noise suppression pulse to the associated connection noise suppression amplifier, the first portion of the direct current is increased in the first path and the second portion of the direct current is blocked by the diode in the second path which results in the unvarying of the total current.

References Cited by the Examiner

UNITED STATES PATENTS

| | | | |
|---|---|---|---|
| 2,951,125 | 8/60 | Andrews | 179—18 |
| 3,005,876 | 10/61 | Ketchledge | 179—18 |
| 3,012,235 | 12/61 | Rochelle | 178—18 |
| 3,015,697 | 6/62 | Klinkhamer | 179—18 |
| 3,033,936 | 8/62 | Simms | 179—18 |
| 3,064,237 | 11/62 | Schubert | 179—18 |

ROBERT H. ROSE, *Primary Examiner.*

WALTER L. LYNDE, *Examiner.*